United States Patent [19]

Willis

[11] 3,795,762

[45] Mar. 5, 1974

[54] PLURAL OPERATING MODE TELEVISION RECEIVERS

[75] Inventor: Donald Henry Willis, Indianapolis, Ind.

[73] Assignee: RCA Corporation, New York, N.Y.

[22] Filed: Jan. 17, 1972

[21] Appl. No.: 218,109

Related U.S. Application Data

[63] Continuation of Ser. No. 832,291, June 11, 1969, abandoned.

[52] U.S. Cl. ...... 178/5.4 R, 178/5.4 CD, 178/7.3 R

[51] Int. Cl. ........................ H04n 9/00, H04n 5/44

[58] Field of Search.. 178/5.4 R, 5.4 CD, 6.6 A, 178/7.3 R, 7.3 DC, 6.6 TC

[56] References Cited

UNITED STATES PATENTS

| | | | |
|---|---|---|---|
| 3,683,107 | 8/1972 | Camras | 178/5.4 CD |
| 3,399,272 | 8/1968 | Krause | 178/6.6 A |
| 3,549,901 | 12/1970 | Ross | 178/5.4 R |
| 3,596,008 | 7/1971 | Camras | 178/6.6 A |
| 3,270,131 | 8/1966 | Dinter | 178/6.6 A |
| 3,136,866 | 6/1964 | Barry | 178/6.6 A |
| 3,335,218 | 8/1967 | Johnson | 178/5.6 |

*Primary Examiner*—Robert L. Griffin
*Assistant Examiner*—George G. Stellar
*Attorney, Agent, or Firm*—Eugene M. Whitacre; Charles I. Brodsky

[57] ABSTRACT

A television receiver is disclosed which is capable of operating in any one of a plurality of modes.

The receiver has circuitry enabling it to respond to a conventional radio frequency transmission in one mode. An external monitor mode is available by disabling the receiver's front end processing circuitry and switching an input terminal of the receiver's video amplifier to an output terminal of an external amplifier, whose bias is controlled by the receiver's own keyed AGC circuit. The external biased controlled amplifier injects a signal into the receiver's video amplifier of a magnitude comparable to the magnitude of a signal appearing in the video amplifier during a radio frequency transmission mode, enabling the receiver circuitry to perform substantially similar.

The external amplifier includes peaking circuitry for enabling the receiver to respond to externally injected composite color signals.

The external monitor mode further includes provisions for changing the filter bandpass in the horizontal phase control loop to enable the receiver to follow taped horizontal sync.

A recording amplifier circuit is provided to enable the user to record on suitable apparatus, a composite signal available in the receiver during an RF transmission, for later playback through the receiver in the monitor mode.

7 Claims, 4 Drawing Figures

INVENTOR.
DONALD HENRY WILLIS

BY Arthur L. Plevy
Attorney

INVENTOR
DONALD HENRY WILLIS

BY Arthur L. Plevy
ATTORNEY

INVENTOR
DONALD HENRY WILLIS

BY Arthur L. Pilroy
ATTORNEY

INVENTOR
DONALD HENRY WILLIS
BY Arthur L. Plevy
ATTORNEY

INVENTOR.
DONALD HENRY WILLIS
BY
Arthur L. Plevy

PLURAL OPERATING MODE TELEVISION RECEIVERS

This is a continuation of application Ser. No. 832,291, filed June 11, 1969, now abandoned.

This invention relates to television receivers and more particularly to a television receiver adapted to receive RF transmitted video signals, as well as video signals provided from a tape recorder, a television camera or another suitable video source.

Television receivers have found widespread use for entertainment, education, industry and in other areas as well. In many localities, besides the well known national television stations, there exist other stations whose primary object is to transmit programs and information of an educational nature. Educational television has been adopted by many of our school systems and is widely utilized both with such transmitted programs and with pre-recorded taped programs as well.

A receiver utilized in this particular environment, to be universally adaptable, should desirably respond to those transmitted programs, as well as those programs pre-recorded on a tape. Furthermore certain of our educational systems possess their own camera equipment whereby a classroom lecture or other event may be locally televised and routed to a plurality of other locations through a cable system. As one can see, the signals that such a receiver must be capable of responding to are fundamentally quite different.

Basically, the major differences are as follows. In the case of the RF transmission, the video information is modulation on a carrier signal, which must be received, amplified, converted to an IF signal, gain controlled, and then detected. In the case of tape playback or cameras, such a signal is a conventional video (NTSC) signal which is not superimposed upon a carrier. During an RF transmission various disturbances can affect the signal, subsequent to the demodulation of the desired video signal. Such effects are frequency and phase responsive and hence certain care must be exercised in the receiver design to provide an optimum display.

In the instance of a color transmission such distortions are even more pronounced and hence result in particular design specifications for the color receiver. Many of these considerations involve the tailoring of the IF amplifiers, the RF amplifiers, certain peaking and delay provisions in the respective chrominance and luminance channels of the receiver, and so on.

When a television signal is not propagated and not superimposed on a carrier, but is the actual NTSC signal or video information similar to that which the receiver would normally obtain by the demodulation process, such a signal may be injected directly into the first video amplifier stage or into the video amplifier chain. However, if the receiver is to be capable of responding to an RF transmitted signal as well, the injection of such a signal is not easily accomplished without considering the differences between the video information signal and the video signal obtained from the RF transmitted signal. Such differences must be resolved in a receiver which is compatible with a transmitted RF signal and with video signals derived from other sources such as tape and so on.

It is anticipated that in the very near future there will be available to the public, tape recorders, camera equipment and pre-recorded tapes capable of operating with both color and monochrome receivers as normally found in the home. Such a product line would enable the consumer for example, to make his own color tapes, play them back through his television receiver or purchase pre-recorded tapes for such playback. Furthermore, with such capabilities, the consumer would also desire, in certain instances, to tape a radio frequency transmitted program, which is being received on his home receiver, for future use. It will be shown, subsequently, that in order to implement such a universally responding television receiver certain considerations must be accounted for, in order to provide a receiver which is relatively inexpensive while further being capable of optimum display performance.

It is therefore an object of the present invention to provide a television receiver adapted to receive RF transmitted video signals, as well as signals provided from a tape recorder, a television camera or other suitable video signal source.

A further object is to provide an improved television receiver adaptable for receiving and displaying both monochrome and color radio frequency transmissions and other video signals from tapes, cameras and so on.

Still another object is to provide improved record and playback amplifiers coupled to a conventional receiver adapting it for use with tape playback and record apparatus.

These and other objects of the present invention are provided for in the embodiment thereof by utilizing the AGC circuit of the receiver to control the d.c. level of the external signal which is coupled to the receiver by means of an external bias controllable amplifier. The output of the amplifier is coupled to the receiver's video amplifier by means of a selectively operated switch. The switch includes other contacts which serve to disable the receiver's front end processing circuitry to prevent radio frequency transmitted signals from being applied to the video amplifier during the external signal monitor mode.

Further features of the present invention include a resonant circuit coupled to the external video amplifier for affecting the amplitude and bandpass of the chrominance signals with respect to the luminance signals during the external monitor mode to inject into the receiver's video amplifier a composite signal similar to that which the receiver would process when operating with a radio frequency transmitted signal.

Still other features of the present invention include a recording amplifier section which is coupled to the receiver's video amplifier for processing the detected video signal obtained from the output of the video detector during an RF transmission. The recording amplifier includes a selective peaking network for increasing the amplitude of the chrominance components of the composite signal with respect to the amplitude of the luminance signals. The amplifier further includes an additional delay line to provide a fidderential delay between those components of a magnitude to provide another composite signal similar to a conventional NTSC signal for application to a tape recorder.

Other features of the present invention include circuitry for changing the effective filtering at the output of the horizontal phase detector to enable the receiver to synchronize to sync pulses which emanate from a tape source during the monitor mode, thereby enabling the horizontal oscillator to follow higher phase perturbations in the sync pulse obtained during the playback of an external composite signal recorded on a tape.

These and other objects of the present invention will become clearer if reference is made to the following specification when read in conjunction with the accompanying drawings in which.

AUTOMATIC BIAS CONTROL

In the modification of a television receiver adapting it to accept video information not impressed on a carrier wave, it is desirable to inject the video signal directly into the video amplifier of the receiver. The magnitude of the injected signal preferably should be at a level which is approximately equal to the level that would exist at the point of injection when the receiver is operated with an RF transmitted signal. For example, in a receiver employing vacuum tubes it would be desirable to inject the signal at the grid or cathode of the first amplifier stage. The first video amplifier stage as utilized is that stage or stages immediately following the video detector. Therefore the automatic gain control (AGC) circuit of the receiver which is usually driven by this amplifier will receive a signal similar to that which is sent to the AGC circuit in normal receiver operation. In normal receiver operation, with a radio frequency transmitted signal, the AGC circuitry serves to adjust the gain of the tuner and the IF to cause the instantaneous horizontal sync tip level to stay at a predetermined level regardless of the antenna signal strength. AGC is a conventional function which may be provided by a typical television receiver in order to cause the same to perform optimally over all channels and during all conditions of signal propagation. When the receiver is not processing an RF signal the AGC control circuitry can still be put to use in conjunction with another video source such as tape, TV camera and so on.

Figure 1:
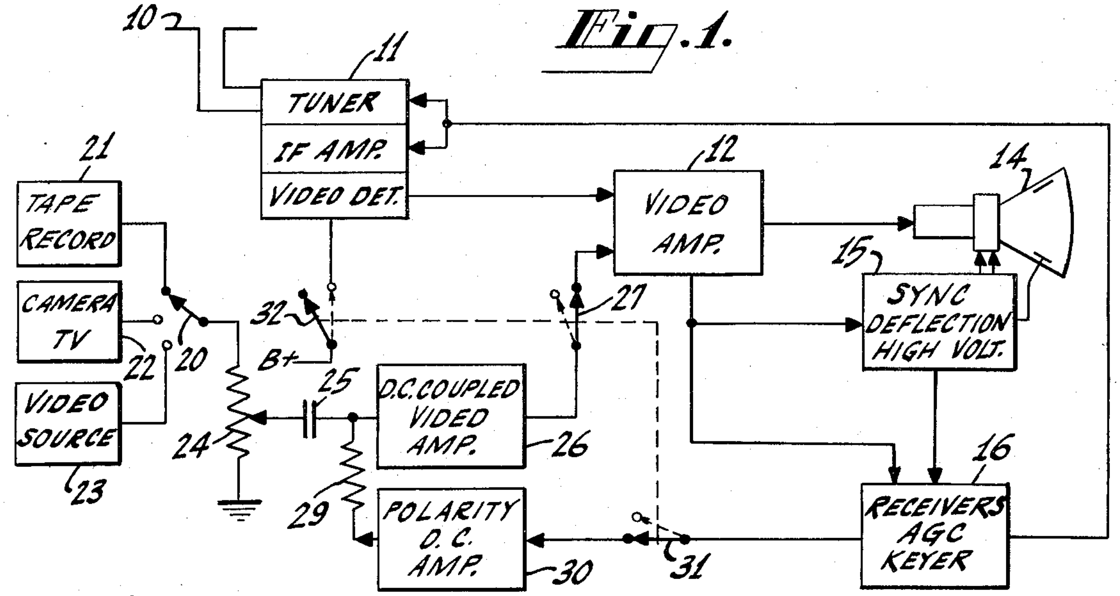
FIG. 1 is a schematic diagram in block form of a television receiver employing an amplifier controlled from the receiver's AGC circuit according to one aspect of the present invention.

If reference is made to FIG. 1 there is shown an antenna 10 which is capable of receiving RF transmitted television signals and applying the same to an input of a tuner, IF amplifier, and video detector module 11. The radio frequency signal is amplified by the tuner, converted to a lower frequency IF signal, and detected to provide at the output of the video detector a demodulated signal. Such functions are very well known and are incorporated in most color and monochrome receivers. The output of the video detector is conventionally applied to a video amplifier chain 12 and thence applied to a kinescope 14. The kinescope 14 is also coupled to suitable circuitry shown generally as module 15. Module 15 has an input terminal coupled to the video amplifier 12. Module 15 provides deflection signals and operating potentials enabling the production of a raster, on the face of the kinescope 14. Most receivers, as indicated above, include a keyed AGC circuit 16 whose function is to provide sufficient control of the tuner and IF gain to cause the instantaneous sync level to stay at some predetermined value regardless of the antenna signal strength. Generally, the AGC is of a keyed type, and provides a control voltage proportional to the magnitude of the video signal at some point in the video amplifier chain. The control voltage is applied to the RF amplifiers or tuner and IF amplifiers to increase the gain thereof for decreasing magnitude signals at the antenna or to decrease the gain for increasing signals. In this manner the portion of the signal amplitude carrying sync in the receiver is maintained relatively constant and independent of the channel tuned to, or of the normally anticipated different magnitude signals received at the antenna 10.

Accordingly, the AGC function in a receiver is relatively important to ensure an optimum display over a wide range of signal amplitude variations.

FIG. 1 further shows a switch 20 having three contacts respectively coupled to a tape recorder 21, a television camera 22 and another video source 23. The arm of the switch 20 is coupled to a potentiometer 24. The variable arm of potentiometer 24 is a.c. coupled through capacitor 25 to the input of a d.c. coupled video amplifier 26 having an output terminal coupled to the arm of a mode selector switch 27. One contact of switch 27 is coupled to an input of the video amplifier 12 while a second contact removes this connection. The input to the d.c. coupled amplifier 26 is also coupled through a resistor 29 to the output of a second d.c. amplifier 30 referred to as Polarity D.C. Amplifier. The input to amplifier 30 is coupled through another section 31 of the mode selector switch 27 to the output of the receiver's keyed AGC circuit 16. A further contact 32 of the mode selector switch 27 removes B+ from module 11 for disabling the tuner, IF amplifier and video detector shown included therein. FIG. 1 shows all the aformentioned contacts of the mode selector switch operated in the video monitor position. Switch 20 is coupled to the output terminal of a tape recorder 21 whose signal thus appears across potentiometer 24. Potentiometer 24 operates to provide input level control and is necessary to accommodate the various anticipated levels from tape recorders, cameras and other video sources. With the connection shown in FIG. 1, i.e., the mode selector switch operating in the video monitor position, the operation of the receiver is as follows.

The tuner, IF amplifier and video detector module 11 is disabled by removing B+ therefrom, and hence there can be no signals applied to the video amplifier due to RF transmissions. The tape machine 21, for example, has its output terminal coupled to the input terminal of the d.c. coupled video amplifier 26. Video amplifier 26 responds to the playback signals from the tape machine, amplifies them to a suitable level and applies them to an early stage of the video amplifier 12 via switch 27. The video amplifier stage 12 or an earlier stage, to which the amplifier 26 is coupled, is preferably the stage that drives the sync, and AGC circuits. In this manner the receiver operates conventionally after the injection of the tape recorder signal. However, the signal emanating from a tape, television camera or other video source may vary in amplitude due to the pecularities of the particular source. Therefore proper adjustment of potentiometer 24 is important in maintaining a proper display as would be the case for the RF transmission.

The keyed AGC circuit 16 is coupled through switch 31 to the d.c. polarity amplifier 30 having its output terminal coupled to the input terminal of amplifier 26 via resistor 29. The signal voltage from the AGC circuit 16 as amplified by the polarity amplifier 30 is used to bias the input of the d.c. coupled amplifier 26 through resistor 29. The polarity of signal applied provides negative feedback for amplifier 26 while the d.c. amplifier 30 provides sufficient gain to cause the instantaneous horizontal sync tip level at the same point, as described above, in the video amplifier, to stay at the same predetermined value.

As shown in FIG. 1 the receiver's own AGC circuit 16 thus becomes part of the automatic bias loop for monitor operation of the receiver with other video sources. The advantages of this particular system are that the operating points of the amplifier 12 are the same as during normal operation as with a transmitted RF signal. This results in little brightness shift withmmode switching between the various external sources and the RF transmission. Furthermore any critical operating specifications placed on the operating point of a video amplifier 12 can be virtually disregarded as the amplifier is operated substantially identically with the nominal mode defined by the RF transmission. Also, maintenance of the sync tip at a fixed level due to the operation of the AGC, results in effective d.c. restoration of the signal as coupled to the kinescope. This, therefore, provides the viewer with an optimumly bright picture.

In summary the receiver's own AGC circuit 16 which would normally operate on the tuner and IF amplifiers is used to advantage when operating the receiver as a monitor for displaying other video signals as described above. Utilizing the keyed AGC circuit 16 in the above described manner, therefore serves to maintain all the advantages of AGC which are necessary when operating with external sources such as tape recorders, cameras and so on, while further assuring that the television receiver will function as designed without the necessity of substantially changing the internal receiver parameters. This enables the receiver to operate substantially as intended for RF transmissions by simply causing the mode selector switch shown in FIG. 1 to be selectively operated in the dashed line position.

It is noted that the above described utilization of the AGC circuitry could be used to advantage in either a monochrome or color receiver.

Figure 2:
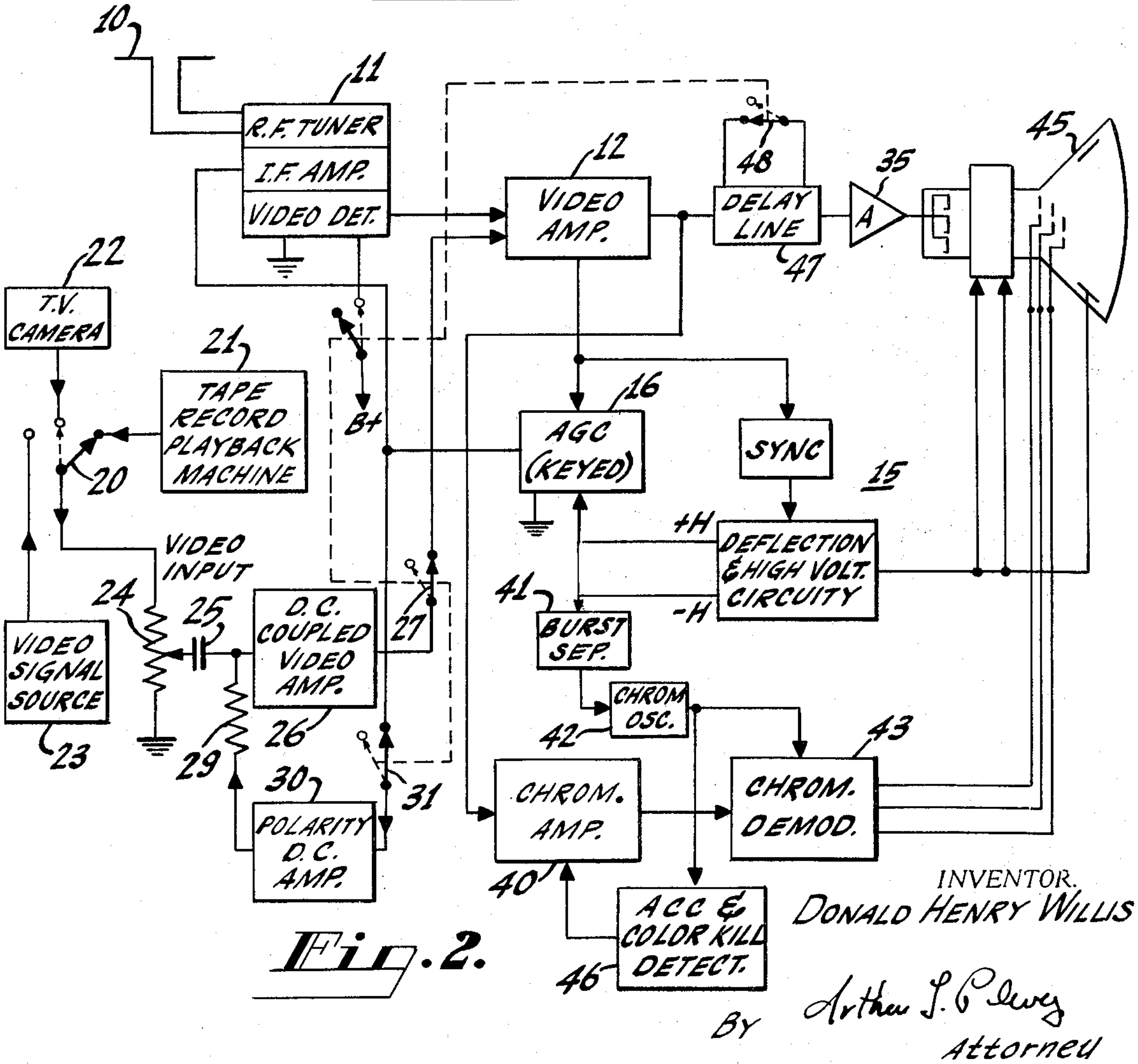
FIG. 2 is a schematic diagram in block form showing a color television receiver adapted to respond to both external video signals and video signals modulated on an RF carrier.

Color Receiver Circuits For Recording And Playback of Signals With A Modified Conventional Type Color Receiver Referring to FIG. 2, there is shown a schematic diagram, in block form, of a color television receiver which is adaptable for receiving RF transmitted programs as well as for playing back and monitoring video signals emanating from other sources, such as a television camera 22, tape recorder playback machine 21 or some other suitable video source 23.

Briefly, the television receiver shown in FIG. 2 utilizes the same AGC concept as described in conjunction with FIG. 1 and hence similar components performing similar functions retain the same reference numerals. Primarily, the color receiver differs from the monochrome receiver in the chrominance processing channel, which basically comprises a chrominance amplifier 40 consisting of one or more stages of selective bandpass amplifiers having a given gain with a frequency response centered within the chrominance subcarrier signal range. A burst separator 41 is keyed by means of a pulse taken from the horizontal synchronizing circuits 15 which pulse gates the separator 41 into conduction to provide at its output an amplified version of the oscillatory burst signal transmitted during a color transmission. The output of the burst separator 41 is coupled to a chrominance oscillator 42, which provides an output signal, phase synchronized to the burst and determinative of the chrominance subcarrier frequency necessary for demodulating the chrominance sideband signals. Accordingly, one output of the chrominance oscillator 42 is coupled to an input of chrominance demodulator 43 and another input to the demodulator 43 is obtained from the chrominance amplifer 40. The outputs of the demodulator 43 are thence coupled to suitable electrodes of the color kinescope 45, which may be a three gun shadow mask device.

An ACC and color killer detector circuit 46 has an input coupled to the oscillator circuit 42 and serves, in general, to maintain the amplitude of the burst signal at the output of the chrominance amplifier 40 relatively constant in spite of varying signals coupled to the antenna. This action is commonly referred to as automatic chroma control, and as such, serves to supplement the AGC for the higher frequency chrominance components which are subjected to selective attenuation due to propagation path and other changes. A further function of the ACC and color killer 46 is to disable the chrominance amplifier 40 during a monochrome transmission to prevent spurious signals from adversely affecting the display. The above described modules are well known and exist in most conventional color receivers. Also shown in FIG. 2 is a delay line 47 in the luminance channel. Such a delay line 47 is commonly referred to in the art as a luminance delay line and exists in a color receiver to compensate for the delay suffered by the chrominance signals as processed by the narrow band chrominance amplifier as compared to the relatively lesser delay afforded to the luminance signals as amplified by the wide band luminance amplifier 12. Therefore, the purpose of the delay line is to delay the luminance signals so that they arrive at the cathodes of the kinescope at the same time, the associated chrominance signals arrive at the grids. When the receiver is operated in a video monitoring mode, as mentioned in FIG. 1, for example, B+ is removed from the IF amplifier, contained in module 11 via switch 32. Switch 32 may be a suitable wafer configuration or contact on the mode selector switch 27. The receiver can now respond to a video signal injected directly into the video amplifier.

However, removal of the IF amplifier action in the manner described above, results in an interesting phenomenon, and that is that the delay afforded by the delay line 47 is now too long and hence the chrominance signals with that delay, as utilized in a conventional receiver, will arrive at the kinescope grids before the luminance signals arrive at the cathodes. Accordingly, it has been found that in order to operate a conventional receiver both for those signals transmitted through space on a carrier, and for video signals received directly from a suitable source as a tape machine or camera, the delay afforded by the luminance delay line has to be lessened for the monitor mode. Therefore, there is shown a contact 48 coupled to the mode selector switch, shorting a section of the delay line 46 when the receiver is used as a monitor for displaying color taped video signals or signals from other sources.

Figure 3A:
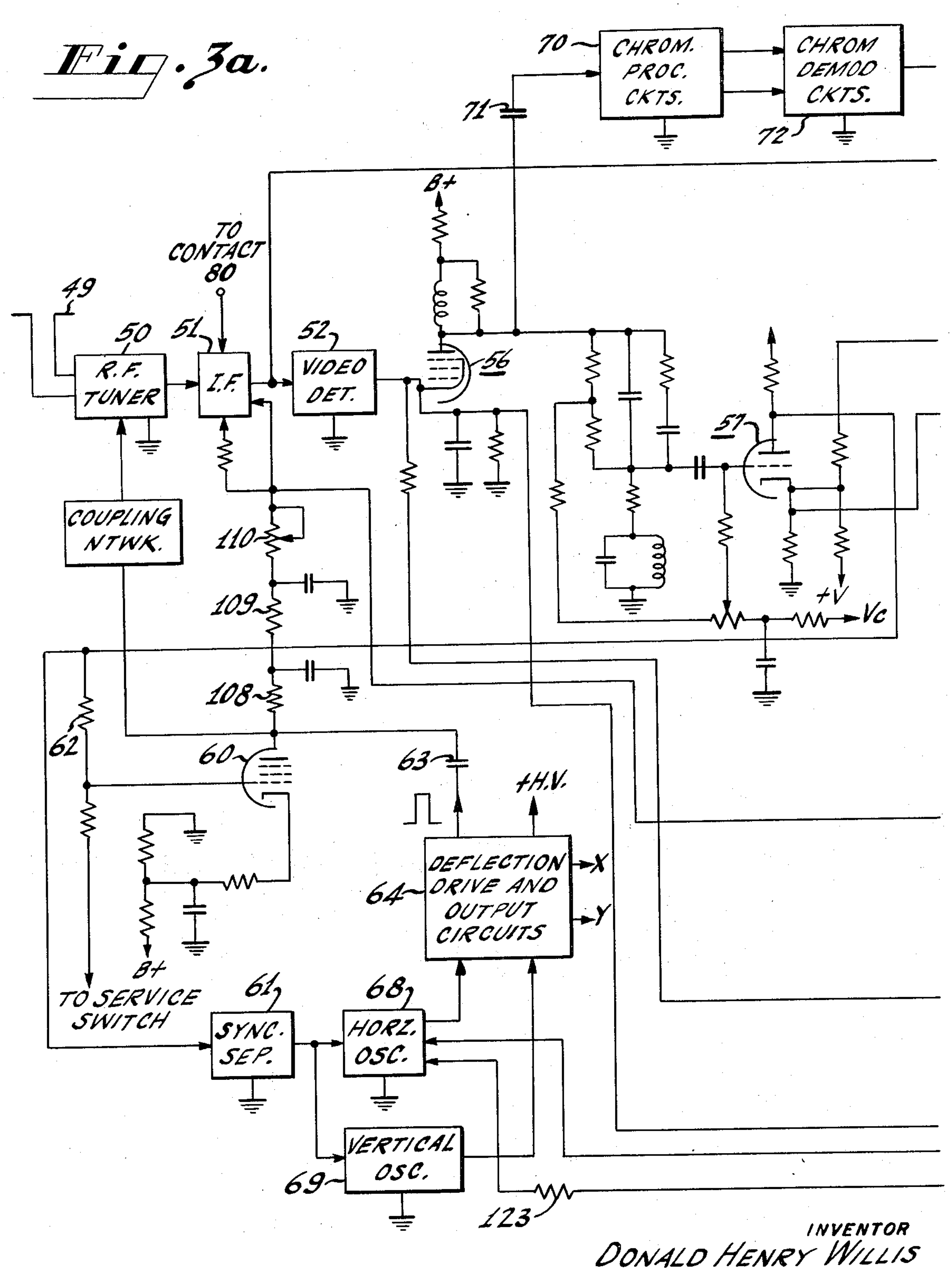
FIG. 3 is a detailed schematic diagram, partially in block form, of a color television receiver adapted for receiving and recording RF transmitted signals and for responding directly to external video signals.
Figure 3B:
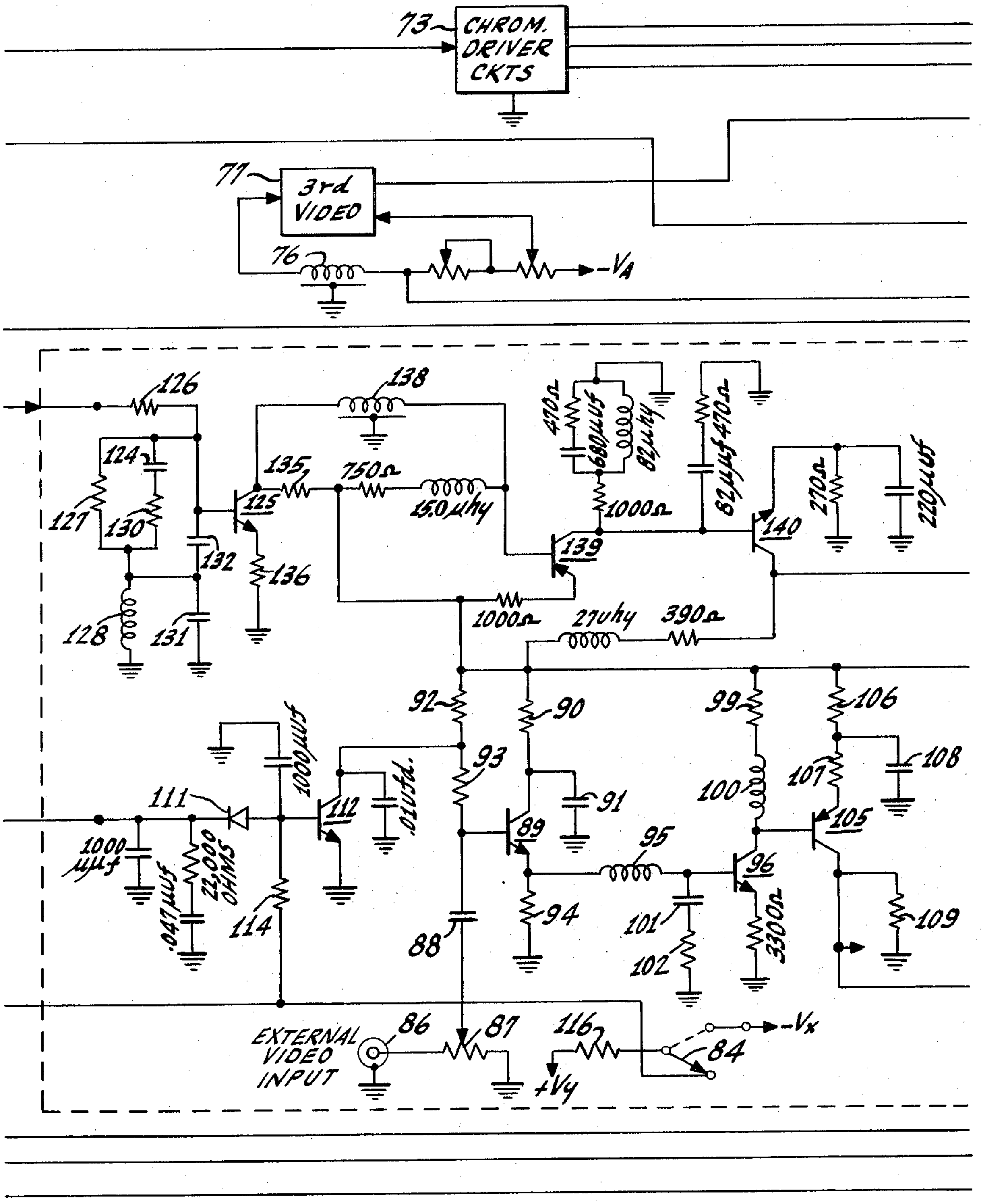
Figure 3C:
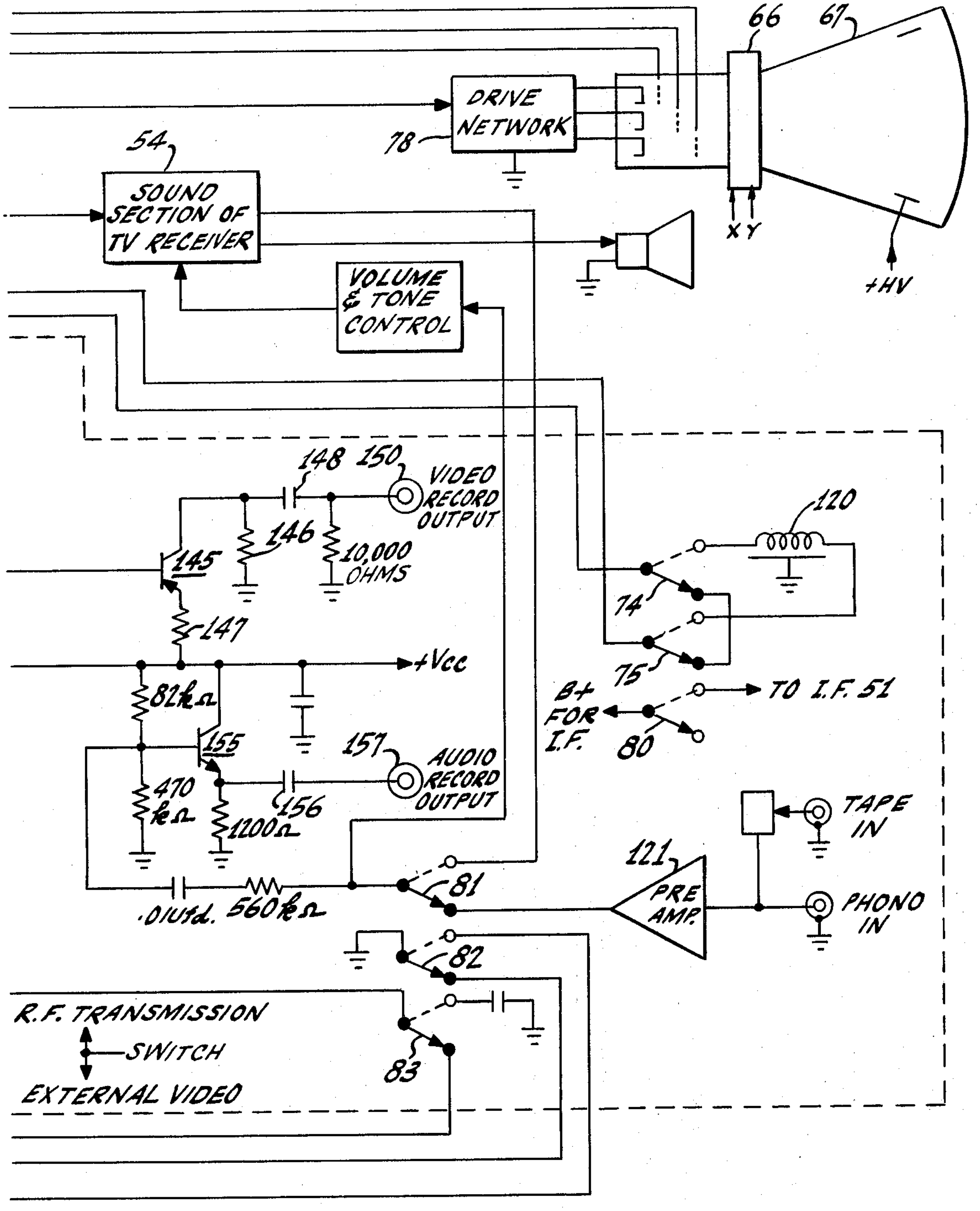

Referring to FIG. 3, there is shown a schematic diagram, partially in block form, of a color television receiver capable of responding to both RF transmitted signals and video signals from other sources. For an example of a suitable receiver, possessing many of the features to be described herein, see a publication entitled RCA Television Service Data, Chassis CTC 38 Series, No. T18 (1968) distributed by the RCA Sales Corporation, 600 North Sherman Drive, Indianapolis, Indiana.

An antenna 49 is coupled to the input of a radio frequency tuner 50 which provides at its output a signal which is applied to the IF amplifier 51. The IF amplifier 51 has an output terminal coupled to the input terminal of a video detector 52, and to the sound section 54 of the television receiver. The output of the video detector 52 is conventionally direct coupled to the input of a suitable video amplifier. In this particular case the video amplifier comprises a first amplifying stage 56 which includes a pentode device. The plate electrode of the pentode is coupled to the grid electrode of a triode amplifier 57 having a plate and cathode loads for respectively driving the sync and AGC circuits, and the luminance channel. Such a video amplifier is used, for example, in the above mentioned CTC 38 chassis. The plate electrode of the triode amplifier 57 is coupled to an input of the sync separator stage 61 and to the input electrode of a keyed AGC pentode 60 via resistor 62. The pentode stage 60 is keyed by means of a positive pulse applied through capacitor 63 coupled between the plate electrode of pentode 60 and the deflection drive and output circuit module 64. The keyed pentode 60 provides at the plate electrode a control voltage proportional to the magnitude of the sync tip level of the signal applied to the grid. The plate load includes suitable R–C filter networks for filtering the control voltage before application thereof to the RF and IF amplifiers. The deflection drive and output circuit module 64, includes the vertical and horizontal output circuits including the flyback transformer and the various high voltage circuits normally found in a conventional receiver. Accordingly, there is shown two output leads from module 64 (labelled X and Y) to supply horizontal and vertical deflection waveshapes for application to the yoke 66 associated with the kinescope 67, which may be a three gun shadow mask device. The drive signals for the deflection circuits are derived from the horizontal oscillator 68 and the vertical oscillator 69 which are synchronized by the sync separator 61. Conventionally in such a receiver the chrominance processing circuits 70 including the chrominance bandpass amplifiers, the burst separator, the chrominance oscillator, the automatic chroma control circuits and color killer are driven from the first video amplifier 56 having the plate electrode a.c. coupled to the processing circuitry 70 by means of capacitor 71. The outputs of the chrominance processing circuit 70 are coupled to the chrominance demodulator circuits to provide color difference signals suitable for application to the kinescope 67 via the chrominance driver circuits 73. The output from the cathode of the triode video amplifier is coupled, during normal receiver operation, through a switch contact 74 through delay line 120 and then through contact 76 to the input of an additional luminance delay line 76. The delay line 76 has an output terminal coupled to the input terminal of a video amplifier 77. Amplifier 77 drives the cathodes of the kinescope 67, through a suitable network 78 with the relatively wideband luminance signals. The delay line 120 and 76 are selected to assure that the luminance signals as amplified by the wideband amplifier will arrive at the cathodes of the kinescope 67 approximately simultaneously with the arrival of the chrominance signals at the kinescope grids. It is noted that the receiver with the exception of the switch contacts 74 and 75, and the split delay lines 120 and 76, briefly referred to above, is of a conventional type as will be seen by referring to the above noted service publication.

The additional circuitry included in this receiver adapting it to respond to external video signals, such as those emanating from a tape recorder or camera, will now be described in greater detail.

The aforementioned switch contacts 74 and 75 are contacts on the same switch which controls other contacts as 80, 81, 82, 83 and 84. Each of the above noted contacts is in a single pole, double throw configuration, although other suitable switching arrangements could be used as well. Shown in FIG. 3 is a switch operation schematic which indicates that when the switch contacts 74, 75 and 80 to 84 are placed in the dashed line position, or moved upwardly, the receiver is responding conventionally to an RF transmission. When the switch contacts are placed in the positions shown in the Figure the receiver is responsive to an external video signal derived from a source as noted above.

For purposes of FIG. 3, the above noted switch contacts are placed in the position, as shown, corresponding to utiliza-tion of the receiver as an external video monitor. A source of external video signals is coupled to connector 86 having a terminal thereof coupled to potentiometer 87. Potentiometer 87 functions to provide an input level control to enable the user to adjust the magnitude of the signal as applied to the receiver. The variable arm of potentiometer 37 is a.c. coupled via capacitor 88 to the base electrode of a transistor amplifier 89. Transistor amplifier 89 is arranged in an emitter follower configuration having a collector electrode coupled through a current limiting resistor 90 to a source of operating potential designated as $+V_{cc}$. The collector electrode is bypassed for a.c. signals by means of capacitor 91. A base biasing network for amplifier 89 includes resistors 92 and 93 coupled between the $+V_{cc}$ supply and the base electrode. The emitter electrode of transistor 89 is returned to the point of reference potential through a load resistor 94 and is coupled through an inductor 95 to the base electrode of a transistor amplifier 96. The transistor amplifier 96 is arranged in a common emitter configuration and has a collector load comprising a resistor 99 in series with shunt peaking inductor 100 coupled between the $+V_{cc}$ supply and the collector electrode.

Inductor 95 coupled between the emitter electrode of transistor amplifier 89 and the base electrode of transistor amplifier 96 is series resonant with capacitor 101. Capacitor 101 is coupled in series with a "Q" damping resistor 102 between the base electrode of amplifier 96 and ground. The inductor 95, capacitor 101 and resistor 102 form a low Q resonant circuit functioning as an intermediate frequency amplifier simulator circuit for the chrominance subcarrier signal components. The collector electrode of transistor amplifier 96 is coupled to the base electrode of a transistor amplifier 105 having the emitter electrode coupled to the $+V_{cc}$ supply through the series resistors 106 and 107. A bypass capacitor 108 is coupled between the junction of resistors 106 and 107 and a point of reference potential.

The collector electrode of transistor amplifier 105 is coupled through resistor 109 to a point of reference potential and also to the arm of the switch 83 which is, as shown, in the external video position. The switch 83 couples the collector electrode of transistor 83 to the cathode electrode of the first video amplifier 56. This coupling enables the video signal as amplified by the aforementioned stages to be injected directly into the cathode of the first video amplifier 56. It is also noted that for the external video monitor position, contact 30, as shown, serves to remove B+ from the IF amplifier 51. This disables the front end circuitry of the receiver to block any radio frequency signal from being processed during the external video monitor mode. Pentode amplifier 56 amplifies the injected cathode signal to provide at its plate electrode the amplified video signals as would normally have been provided thereat for an RF transmission. Furthermore, the action of the aforementioned inductor 95 in conjunction with capacitor 101 serves to operate on the video signal emanating from the external source to intentionally affect the signal as it would have been affected if it were derived by demodulating an IF signal.

To accomplish this the resonant peak of the low Q series network is selected about 3.08 MHz or slightly lower. This permits the chrominance sideband frequencies to be amplified on the sloping portion of the bandpass of the circuit. Essentially if the radio frequency signal were transmitted the chrominance sideband frequencies would be amplified by the IF amplifier on the same point of relatively the same slope on the bandpass response of the IF amplifier.

The reason for this low Q series resonant circuit therefore, is to intentionally distort an optimum NTSC signal wherein the amplitudes of the chrominance components and the luminance components of the signal are relatively flat and have suffered no distortion due to propagation or due to IF and RF amplification.

Many of the circuits in a receiver are tailored to accommodate the radio frequency propagated signals. Examples of such tailored circuits are the bandpass characteristics of the RF and IF stage, and so on. Considering those factors, the optimum NTSC signal has to be predistorted before injection into the first video amplifier of the receiver, in order to enable the receiver to respond conventionally. The amplified signal at the plate electrode of pentode 56 is now coupled conventionally to the chrominance processing circuit 70 via capacitor 71 and thence to the remainder of the chrominance circuit, shown, to supply the kinescope 67 with proper color drive signals. It is seen that as far as the chrominance processing channel is concerned, there is no difference between these external signals and signals it would receive if an RF transmission were present. The chrominance peaking networks which are conventionally found in such a receiver (see above noted service notes) still serve to peak the chrominance signal prior to injection into the demodulator to anticipate the roll-off of the chrominance components due to the IF response and so on. The chrominance peaking networks do not have to be changed or affected, because the video signal was intentionally predistorted by the action of inductor 95 and capacitor 101 as described above.

The amplified video signal at the plate electrode of pentode 56 is coupled to the grid electrode of the triode amplifier 57. The amplified signal appearing at the plate electrode of the triode amplifier 57 is, of course, still coupled to the keyed AGC pentode circuit 60 via resistor 62 and to the sync separator circuit 61. In this manner the horizontal and vertical oscillator circuits 68 and 69 and the deflection drive and output circuits 64 receive similar signals as would be received during a normal transmission and serve, therefore, to provide the necessary potentials and deflection drive waveforms for the production of a raster. However, the AGC circuit as normally coupled to the tuner and the IF amplifier, operates, but does not control these modules as they are disabled because of the removal of B+, for example, from the IF amplifier 51.

However, the plate electrode of the pentode amplifier 60 is coupled through resistors 108, 109 and 110 to the cathode of a diode 111 having its anode coupled to the base electrode of a transistor amplifier 112. Transistor amplifier 112 has the emitter electrode coupled to ground and the collector electrode coupled to the junction between resistors 92 and 93 forming part of the base bias network for transistor amplifier 89. The cathode of the diode 111 and the base electrode of transistor 112 are also coupled through resistor 114 to contact 84, which during the video monitor mode impresses a voltage (referred to as $+V_{u}$) through resistor 116 to forward bias transistor 112 and diode 111. In this manner with diode 111 forward biased the AGC fluctuations appearing across resistor 110 in the plate circuit of pentode 60 serve to modulate or vary the bias of transistor 112. Transistor 112 depending upon its conduction serves to vary the current through transistor 89 by affecting the base current. Consequently variations of the collector current through transistor 89 serves to change the operating voltage at the base electrode of transistor 96. Transistor 112 also serves to invert the polarity of fluctuations as coupled to its base electrode to ensure that the automatic bias action is in the proper phase in relation to the number of stages utilized to preamplify the external signal.

The operation is as follows. If the d.c. level of the signal at the base electrode of transistor 89 becomes too positive, the d.c. level of the signal injected into the cathode of the first video amplifier 56, is also too positive and therefore the amplified d.c. signal level at the plate of pentode 56 is too positive as well. The AGC keyer pentode 60 thus receives a d.c. level video signal at the grid which will not permit conduction. Therefore during this mode transistor 112 conducts more heavily. The increased conduction of transistor 112 thus reduces the d.c. voltage applied to the base electrode of transistor 89. In this manner the d.c. level of the signal applied to transistor 96 decreases as does the d.c. level of the signal appearing at the collector of transistor 105, which is applied to the cathode electrode of the pentode amplifier 56. The action thus reduces the d.c. level at the plate electrode of pentode 56. This therefore serves to maintain the level of the video signal at the plate electrode of pentode 56 approximately equal to the level that would appear thereat during a normal RF transmission, thus enabling the AGC circuit to conduct and maintain the biasing and operating points of the video amplifier relatively constant and under AGC control operation. The triode amplifier 57 via the cathode electrode thereof serves to drive the luminance delay line 76 through the switches 74 and 75 having a pair of contacts thereof shorted together. It is noted that the other contacts of switches 74 and 75 are coupled through a delay line section 120 when the switch is placed in the RF transmission mode by moving the switch arm upwardly. The delay line 120 is therefore placed in tandem with the delay line 76, as mentioned above, to afford a longer delay for the luminance channel during the RF transmission than the delay for processing the external video signal. If the same delay were utilized for the RF transmission as for the external video mode, the luminance signals would arrive at the cathodes of the kinescope after the chrominance signals arrive at the respective grid electrodes during the external video mode. It is believed that the necessity for this delay adjustment is due to the fact that the IF amplifiers and the RF amplifiers are removed from the circuit and hence can not serve to delay the chrominance components of the composite signal different from the luminance components of that signal. Essentially, therefore, the chrominance components during a normal RF transmission as appearing at the plate electrode of pentode 56 have an additional delay relative to the luminance components due to the receiver processing circuitry before they are applied to the chrominance processing circuit 70. This additional delay does not necessarily appear when utilizing video signals from other sources.

Switch 81 provides another useful function which is utilized when operating with taped or other external signals. The contact 81 applies the accompanying sound portion of the external signal, which may be recorded on a separate tape track or may emanate from a suitable sound amplifier circuit, from a preamplifier 121 having an output terminal coupled to the contact and thence through the arm of the switch 81 to the sound section 54 of the television receiver. Such coupling may be through the volume and tone controls of the receiver. The sound signal as applied, bypasses the sound demodulators, as the external audio signal associated with the external video signal appears in the original form. In this manner the video signal can be displayed on the face of the kinescope together with the audio signal coupled through the speaker system of the receiver to provide the viewer with a normal display.

A further contact 82 is shown which has an arm coupled to ground and the two contacts associated with the arm, coupled to the horizontal oscillator module 68. Shown in series with the contact of switch 82, in the RF transmission mode of the receiver, is a resistor 123. The other contact, corresponding to the external video position, is shown generally as coupled directly to oscillator 68. Essentially the function of the switch 82 is as follows:

During normal receiver operation the horizontal oscillator 68 is synchronized by means of the synchronizing pulses derived from the sync separator 61. A phase detector operates to develop a control voltage according to the phase difference between the synchronizing pulses and of the oscillator phase to control the frequency of the horizontal oscillator 68 in order to assure that it is locked to the proper phase. The output of the phase detector is prefiltered to prevent noise and other components from falsely affecting the control voltage and "pulling" the oscillator 68 off frequency. A normal receiver mode specifies a narrow bandpass filter for the control voltage before application thereto to the oscillator circuit. This is necessary because of the anticipated poorer signal to noise levels in the receiver when responding to an RF transmission. However, when operating from other external sources, as described above, and particularly from a tape source, maintaining this amount of filtering prior to the application of the control voltage to the oscillator results in problems. Namely, a typical type of tape recorder which can be adapted to record and playback video signals including composite signals as needed for a color transmission may utilize a helical scan transport. Such helical transports record and play back video information by the use of a plurality of magnetic heads usually two in number. In the typical case two heads are 180° apart on a head wheel. As one head leaves the tape, the other head passes onto the tape to complete the play back or recording of the video information. Due to mechanical tolerances of the recorder and alignment of the heads and so on, the width of the horizontal synchronizing pulse may be effected. The problem arises in that a head entering the tape may be starting to playback the horizontal synchronizing pulse in a different phase than the head just leaving the tape. The filtering network provided for the phase detector during an RF transmission is designed according to an anticipated noise level associated with the incoming video signal. Therefore, the filtering network will undesirably serve to slow up the speed of response of the phase detector output more than desirable, and necessary to accommodate the phase perturbations present in a playback signal. Thus, the amount of filtering must be reduced after the phase detector. Accordinly, the contact 82 serves to reduce the amount of effective filtering during the external video monitor mode to permit the phase detector associated with the horizontal oscillator 68 to respond to the variations which can occur in the phase of the horizontal synchronizing pulse during a tape playback. Increasing the filter bandpass thereby enables the receiver in the monitor mode to follow such transitions more rapidly and hence maintain phase synchronization of the horizontal oscillator 68 in spite of disturbances accompanying the horizontal synchronizing pulses.

In summation from the above describtion, it can be seen how the receiver should be modified to accommodate the various signal sources in order to provide the optimum display independent of the means in obtaining the video.

Still another function is placed on such a universally responding receiver which will enable the user to tape-record programs being received by the receiver when operating with a radio frequency transmitted signal. As indicated above when response to radio frequency transmission is desired the user now places the switches 74, 75 and 80–84 in the dashed line position or moves the arms thereof upwardly.

Referring to FIG. 3 it is seen that the cathode electrode of triode 57 is coupled to the input or the base electrode of a transistor amplifier 125. Coupled between the cathode electrode of triode 57 and a point of reference potential is a selective network comprising resistor 126 in series with the cathode electrode of triode 57 and the base electrode of transistor 125. A resistor 127 in series with an inductor 128 is coupled between the base electrode of transistor 125 and a point of reference potential, and serves as a voltage divider to supply biasing for the transistor 125. A selective network for high frequency compensation comprises a capacitor 124 in series with a resistor 130 and appears in shunt with the resistor 127 and capacitor 132. The inductor 128 is shunted by a capacitor 131 and resonates therewith at the higher frequency end of the composite signal or within the vicinity of the frequency range occupied by the chrominance subcarrier components. The above described resonant network basically comprises a peaking network to peak the chrominance subcarrier components of the composite signal appearing at the cathode electrode of triode 57 so that the attenuation suffered by such components during processing through the IF and RF amplifiers is compensated for. In this manner the amplitude distribution of the signal applied to the base electrode of transistor 125 substantially approximates the conventional NTSC signal. Transistor 125 is arranged in a common emitter configuration having a collector load resistor 135 and a cathode degenerating resistor 136. A delay line 138 is coupled between the collector electrode of transistor 125 and the base electrode of transistor 139. The function of the delay line 138 is to provide a differential delay between the luminance and the chrominance components of approximately 0.2 of a microsecond. It is recalled that when describing the playback circuitry a different delay was required in the luminance channel for the external monitor mode. This was caused by the bypassing of the RF and IF amplifiers which also resulted in approximately a 0.2 microsecond differential delay between the chrominance and luminance components, as compared to that delay between the components when processed through the RF and IF stages. Hence in order to supply a recorder with a signal to be transcribed on a tape one has to make up for the 0.2 microsecond differential delay between the chrominance and luminance components that is suffered at the video detector by the action of the RF and IF stages. This is the purpose of the delay line 138, so that the signal recorded on the tape again corresponds to the conventional NTSC signal wherein there is no substantial differential delay between the luminance and chrominance components. Amplifier 139 serves to amplify the composite signal applied to its base electrode and applies the amplified signal to the base electrode of a subsequent transistor amplifier stage 140 also arranged in a common emitter configuration. Stage 140 functions to further amplify the composite signal to a level suitable for application thereto to the input terminal of a buffer amplifier stage 145. The buffer stage 145 has its collector electrode returned to ground through a load resistor 146 and has the emitter electrode thereof returned to the $+V_{cc}$ supply through a degenerating resistor 147. The composite video signal is a.c. coupled via a large capacitor 143 to a video record output jack 150. The output jack 150 may be coupled by a video cable or some other conventional means to the input terminal of a tape recorder for recording of the video signal on a suitable record medium.

The receiver, with the additional circuitry, described above, can be used to record transmitted radio frequency signals properly demodulated into video by conventional receiver action by means of a tape recorder. It is noted that the sound section of the television receiver is coupled via contact 81 in the dashed line position to apply the audio signal after demodulation by the receiver's sound demodulator to a transistor amplifier output stage 155. Stage 155 is arranged in an emitter follower configuration and has its emitter electrode coupled through a capacitor 156 to a suitable output jack 157 referenced as audio record output. This of course enables the user to simultaneously record the audio portion together with the video portion on a suitable record-play-back apparatus such as a helical machine.

Figure 4:
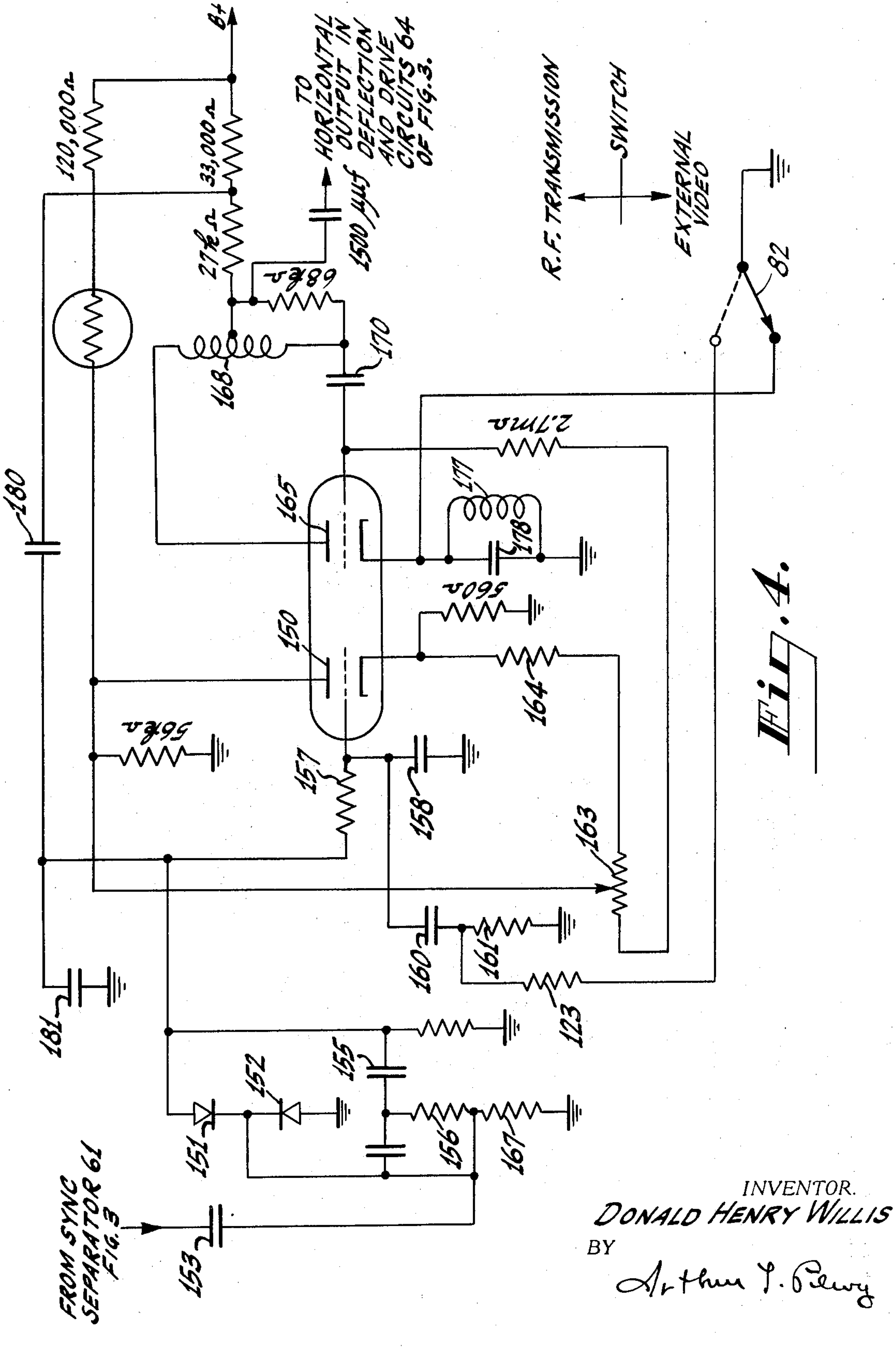
FIG. 4 is a schematic diagram of a horizontal oscillator and phase detector as may be employed in a universally responding receiver according to this invention.

If reference is made to FIG. 4, there is shown a horizontal oscillator circuit, for example, as used in the above noted CTC 38 chassis. The horizontal oscillator circuit includes a triode 150 having a grid electrode coupled to a horizontal phase detector circuit comprising two diodes 151 and 152. The horizontal sync pulse from the sync separator 61 of FIG. 3 is applied to the junction of the cathode electrodes of the diodes 151 and 152 via capacitor 153. The horizontal oscillator signal is applied to the anode of diode 151 via capacitor 180. Capacitor 181 serves to divide the signal amplitude to obtain a proper level. The diodes produce a d.c. control voltage at their output proportional to the phase difference between the horizontal sync pulses and the oscillator signal. The control voltage is applied to the grid electrode of triode 150 via resistor 157. Filtering is available at the grid electrode of triode 150 by means of capacitor 158 coupled between the grid electrode and the point of reference potential, and the selective RC network comprising capacitor 160 in series with resistor 161 coupled in shunt with the capacitor 158. The amplified control voltage which appears between the plate and cathode electrode of triode 150 is impressed upon the horizontal oscillator circuit including triode 165 via the potentiometer 163 in series with resistor 164. The resistors 163 and 164 are coupled between the cathode electrode of triode 150 and the grid electrode of triode 165. Triode 165 is included in the horizontal oscillator section which employs feedback between the plate and grid of the triode through the tapped inductor 168 and capacitor 170. The control voltage coupled via potentiometer 163 to the grid electrode serves to synchronize the horizontal oscillator in phase with the horizontal synchronizing pulses. A tuned circuit comprising an inductor 177 in shunt with a capacitor 178 appears between the cathode electrode of the oscillator triode 165 and ground. The function of the tuned circuit during normal receiver operation is to provide a sinusoidal voltage at the horizontal oscillator frequency, which, in turn, limits the control range of the oscillator and aids in maintaining the horizontal frequency within close tolerances by affording a relatively narrow bandpass for the oscillator during the RF transmission mode. When the receiver is operated in the external video mode as described in conjunction with FIG. 3, switch 82 is in the position shown in FIG. 4 and serves to remove the resistor 123 in shunt with resistor 161 which in turn serves to reduce the filter effect and permit faster transitions of the d.c. control voltage to be applied to the grid of triode 150. At the same time switch 82 in the position shown serves to bypass the tuned circuit comprising inductor 177 and capacitor 178 by returning the cathode electrode of the oscillator 165 to ground. This in turn widens the effective bandpass of the oscillator enabling it to be controlled over a wider range of control voltages with sharper or faster transitions from control level to control level. The oscillator in the monitor mode can therefore change phase and frequency much faster with incoming control information from the phase detector to enable it to follow relatively rapid perturbations in the phase of the horizontal synchronizing pulses, which may occur during a tape playback. When switch 82 is placed in the RF transmission mode resistor 123 appears in shunt with resistor 101 thus serving to lower the resistance of the combination and provide more attenuation of the control signal for higher frequencies at the grid electrode of triode 158. In this mode the parallel resonant circuit coupled to the cathode electrode of triode 165 is also included in the circuit and serves to narrow the control range of the horizontal oscillator.

By way of example included below is a tabulation of component values for use in a circuit as shown in FIG. 3 with a CTC 38 chassis. Components, not included in this tabulation have their respective values listed in the FIGURE.

| | |
|---|---|
| Resistor | |
| 87 | 3500 ohms |
| 90 | 10 ohms |
| 92 | 5600 ohms |
| 93 | 5600 ohms |
| 94 | 3300 ohms |
| 99 | 1500 ohms |
| 102 | 330 ohms |
| Resistor | |
| 106 | 32 ohms |
| 107 | 18 ohms |
| 109 | 220 ohms |
| 126 | 750 ohms |
| 127 | 270 ohms |
| 130 | 180 ohms |
| 135 | 820 ohms |
| 136 | 330 ohms |
| 146 | 82 ohms |
| 147 | 39 ohms |
| Capacitor | |
| 88 | 25 microfarads |
| 91 | 0.01 microfarads |
| 101 | 39 micromicrofarads |
| 108 | 2200 micromicrofarads |
| 124 | 560 micromicrofarads |
| 131 | 470 micromicrofarads |
| 132 | 330 micromicrofarads |
| 148 | 500 microfarads |
| Inductor | |
| 95 | Resonates with capacitor **101** at about 2.5–3.1 MHz |
| (variable | |
| 100 | 120 microhenries |
| 128 | |
| (variable) | Resonates with capacitor **131** at about 4–4.5 MHz |
| Transistor | |
| 89 | 2N3694 |
| 96 | 2N3694 |
| 105 | 2N3644 |
| 112 | 2N3694 |
| 125 | 2N3694 |
| 139 | 2N3644 |
| 140 | 2N3694 |
| 145 | 2N3644 |
| Transistor 155 | 2N3694 |
| Diode 111 | Silicon diode, as an FD222 |

What is claimed is:

1. In a television receiver of the type including processing circuitry for responding to a radio frequency carrier signal modulated by a video signal for providing therefrom a detected video signal, said receiver including a video amplifier responsive to said detected video signal for amplifying and applying the same to display means, and an automatic gain control circuit responsive to said amplitude of said detected video signal to vary bias voltages within said processing circuitry for affecting the gain thereof, in combination, therewith, apparatus for adapting said receiver to respond directly to an external video signal which is not associated with a radio frequency carrier signal, comprising, a. a bias controllable amplifier having an input terminal adapted for application thereto of said external video signal and an output terminal for providing thereat an amplified external video signal, b. first selectively operated means coupling said output terminal of said bias controllable amplifier to an input terminal of said video amplifier when said means are selectively operated in a first position, c. second means coupled to said processing circuitry and responsive to said first selective means being in said first position for disabling said processing circuitry, d. means coupled between said automatic gain control circuit and said bias controllable amplifier responsive to said operation of said first selectively operated means in said first position for enabling said automatic gain control circuit to vary the bias of said bias controllable amplifier according to the d.c. level of the video signal appearing in said video amplifier of said receiver.

2. In a television receiver of the type including processing circuitry for responding to a radio frequency carrier signal modulated by a video signal, for providing therefrom a detected video signal, said receiver including a video amplifier responsive to said detected video signal for amplifying and applying the same to display means, said receiver further including an automatic gain control circuit responsive to said amplitude of said detected video signal for affecting the gain of said processing circuitry, and a sync separator responsive to a synchronizing interval portion of said video signal to provide a sync pulse for application to a phase detector associated with a horizontal oscillator in said receiver, for comparing the phase and frequency of said sync pulse with said oscillator signal for developing a control voltage which is applied to said oscillator via a filter network to control the phase of said oscillator signal thereby phase synchronizing the same to said sync pulse, in combination therewith, apparatus adapting said receiver to respond directly to an external video signal not associated with a radio frequency carrier signal, comprising, a. a bias controllable amplifier having an input terminal adapted for application thereto of said external video signal, and an output terminal for providing thereat an amplified external video signal, b. first selectively operated means coupling said output terminal of said bias controllable amplifier to an input terminal of said video amplifier when said means are selectively operated in a first position, c. second means coupled to said processing circuitry and responsive to the operation of said first selective means in said first position for disabling said processing circuitry, d. means coupled between said automatic gain control circuit and said bias controllable amplifier responsive to said operation of said first selectively operated means in said first position to enable said automatic gain control circuit to vary the bias of said controllable amplifier according to the desired d.c. level of the video signal as appearing at a point of said receiver's video amplifier, and e. means coupled to said filter network responsive to said operation of said selectively operated means in said first position for reducing the amount of filtering of said control voltage when said external video signal is applied to said video amplifier.

3. In a television receiver of the type including processing circuitry for responding to a radio frequency carrier signal modulated by a composite television signal including luminance and chrominance components, for providing therefrom a detected composite video signal, said receiver including a video amplifier, including a delay line, said amplifier responsive to said composite video signal for amplifiying and delaying said luminance components and applying the same to a display means, said receiver including a chrominance amplifier having at least one input terminal common with said video amplifier for amplifying said chrominance components and applying the same to said display means, and an automatic gain control circuit responsive to a synchronizing interval asso-ciated with said composite video signal to provide at an output thereof a control signal in accordance with the amplitude of a sync pulse present within said interval for varying bias voltages within said processing circuitry and thereby controlling the gain thereof in accordance with the amplitude of said control signal, in combination therewith, apparatus for adapting said receiver to respond directly to an external composite video signal not associated with a radio frequency carrier signal, comprising, a. a first bias controllable amplifier stage having an input terminal adapted for application thereto of said external composite video signal, and an output terminal for providing thereat an amplified first external composite signal, b. circuit means coupled to said output terminal of said first amplifier for selectively affecting the characteristics of said chrominance components with respect to said luminance components, to provide at an output thereof a second external composite signal, c. first selectively operated means coupling said output terminal of said circuit means to said common input terminal of said luminance and chrominance amplifiers when said means are selectively activated in a first position, d. second means coupled to said processing circuitry and responsive to said operation of said first selectively operated means in said first position for disabling said processing circuitry, e. third means coupled between said automatic gain control circuit and said first bias controllable amplifier responsive to said operation of said first selectively operated means in said first position for enabling said automatic gain control circuit to vary the bias of said first amplifier in accordance with the magnitude of said synchronizing pulse as present in said external composite video signal.

4. In a television receiver of the type including processing circuitry for responding to a radio frequency carrier signal modulated by a video signal for providing therefrom a detected video signal, said receiver including a video amplifier responsive to said detected video signal for amplifying and applying the same to display means, and an automatic gain control circuit coupled to vary bias voltages within said processing circuitry for controlling the gain thereof, in accordance with the amplitude of said detected video signal, to maintain the d.c. level of a synchronizing interval portion of said video signal at a relatively constant level at a predetermined point in said video amplifier, in combination therewith, apparatus for adapting said receiver to respond directly to an external video signal which is not associated with a radio frequency carrier signal comprising, a. a bias controllable amplifier having an input terminal adapted for application thereto of said external video signal, and an output terminal for providing thereat an amplified external video signal, b. first selectively operated means coupling said output terminal of said gain controllable amplifier to an input terminal of said video amplifier when said means are operated in a first position, c. second means coupled to said processing circuitry and responsive to said operation of said first selectively operated means in said first position for disabling said processing circuitry, d. third means coupled between said automatic gain control circuit and said bias controllable amplifier responsive to said first selectively operated means in said first position for enabling said automatic gain control circuit to vary the bias of said amplifier to maintain the d.c. level of the synchronizing interval portion of said external video signal at said predetermined point in said video amplifier, substantially at said relatively constant level.

5. The combination according to claim 4, further comprising, a. a sync separator responsive to said synchronizing interval portion of said video signal to provide at an output terminal thereof a sync pulse, b. an oscillator circuit for providing at an output terminal thereof a signal having a repetition rate relatively equal to the repetition rate of said sync pulse, c. means coupled to said oscillator circuit and said sync separator for providing at an output thereof a control voltage in accordance with any phase difference between said sync pulses and said oscillator signal, d. a filter network having a given bandpass coupled between said means and said oscillator for applying said control voltage to said oscillator to synchronize said oscillator signal to said sync pulses, and e. means coupled to said filter network responsive to the operation of said first selectively operated means being in said first position for increasing said given bandpass when said first selective means are operated.

6. In a television receiver of the type including processing circuitry for responding to a radio frequency carrier signal modulated by a composite television signal, including luminance and chrominance components, said receiver including a detector for providing therefrom a detected composite video signal, said receiver including a video amplifier, including a delay line, said amplifier responsive to said detected signal for amplifying and delaying said luminance components with resepect to said chrominance components and applying the same to a display means, and said receiver further including a chrominance amplifier having at least one input terminal common with said video amplifier for amplifying said chrominance components and applying the same to said display means, in combination therewith, apparatus for adapting said receiver to respond directly to an external composite video signal not associated with a radio frequency carrier signal, comprising, a. a first amplifier stage having an input terminal adapted for application thereto of said external composite video signal, and an output terminal for providing thereat an amplified version of said external video signal, b. circuit means coupled to said output of said first amplifier for selectively affecting the amplitude of said chrominance components with respect to said luminance components, to provide at an output thereof a second external video signal having different amplitude chrominance components with respect to said luminance components than said first signal, c. first selectively operated means coupling said output terminal of said circuit means to said common input terminal of said luminance and chrominance amplifiers when said means are selectively activated in a first position, d. second means coupled to said processing circuitry and responsive to said first selectively operated means being in said first position for disabling said processing circuitry, e. third means coupled to said delay line of said video amplifier and responsive to said operation of said first selective means being in said first position for short-circuiting a portion of said delay line and thereby reducing the delay between said luminance and chrominance components, whereby said luminance components of said external composite signal as applied to said common input terminal are amplified and delayed by said video amplifier with respect to said chrominance components of said external signal, substantially the same as signal components at said terminal due to a radio frequency transmission.

7. In a television receiver of the type including processing circuitry for responding to a radio frequency carrier signal modulated by a composite television signal including luminance and chrominance components, for providing therefrom a detected composite video signal, said receiver including a video amplifier, including a delay line, said amplifier responsive to said composite video signal for amplifying and delaying said luminance components and applying the same to a display means, said receiver including a chrominance amplifier having at least one input terminal common with said video amplifier for amplifying said chrominance components and applying the same to said display means, and an automatic gain control circuit responsive to a synchronizing interval associated with said composite signal to provide at an output thereof a control signal in accordance with the amplitude of a sync pulse present within said interval for varying bias voltages within said processing circuitry and thereby controlling the gain thereof in accordance with the magnitude of said control signal, in combination therewith, apparatus for adapting said receiver to respond directly to an external composite video signal not associated with a radio frequency carrier signal, comprising, a. a first bias controllable amplifier stage having an input terminal adapted for application thereto of said external composite video signal, and an output terminal for providing thereat an amplified first external composite signal, b. circuit means coupled to said output of said first amplifier for selectively reducing the amplitude of said chrominance components with respect to said luminance components, to provide at an output thereof a second external video signal having different amplitude chrominance components with respect to said luminance components than said first signal, c. first selectively operated means coupling said output terminal of said circuit means to said common input terminal of said luminance and chrominance amplifiers when said first selectively operated means are operated in a first position, d. second means coupled to said processing circuitry and responsive to said first selectively operated means being in said first position for disabling said processing circuitry, e. third means coupled to said delay line of said video amplifier and responsive to said first position operation of said first selective means for short-circuiting a portion of said delay line and thereby reducing the delay between said luminance and chrominance components, f. fourth means coupled between said automatic gain control circuit and said first bias controllable amplifier responsive to said operation of said first selectively operated means being in said first position for enabling said automatic gain control circuit to vary the bias of said first amplifier in accordance with the magnitude of said synchronizing pulse as present in said external composite video signal.

* * * * *

UNITED STATES PATENT OFFICE
CERTIFICATE OF CORRECTION

Patent No. 3,795,762 Dated March 5, 1974

Inventor(s) Donald Henry Willis

It is certified that error appears in the above-identified patent and that said Letters Patent are hereby corrected as shown below:

Column 5, lines 53-55, that portion reading "Color Receiver Circuits For Recording And Playback of Signals With A Modified Conventional Type Color Receiver" should read -- COLOR RECEIVER CIRCUITS FOR RECORDING AND PLAYBACK OF SIGNALS WITH A MODIFIED CONVENTIONAL TYPE COLOR RECEIVER --. Column 8, line 4, that portion reading "contact 76" should read -- contact 75 --. Column 9, line 21, that portion reading "30" should read -- 80 --. Column 12, line 40, that portion reading "Accordinly" should read -- Accordingly --. Column 15, line 33, that portion reading "106 32 ohms" should read -- 106 82 ohms --. Column 18, line 65, that portion reading "resepect" should read -- respect --.

Signed and sealed this 16th day of July 1974.

(SEAL)
Attest:

McCOY M. GIBSON, JR.
Attesting Officer

C. MARSHALL DANN
Commissioner of Patents

FORM PO-1050 (10-69)
USCOMM-DC 60376-P69
☆ U.S. GOVERNMENT PRINTING OFFICE 1969 O—366-334